Patented Mar. 31, 1953

2,633,474

UNITED STATES PATENT OFFICE 2,633,474

1,3-BIS(O-ETHYLPHENYL) GUANIDINE

David J. Beaver, Richmond Heights, Mo., assignor to Monsanto Chemical Company, St. Louis, Mo., a corporation of Delaware No Drawing. Application July 21, 1951,
Serial No. 238,011

1 Claim. (Cl. 260—565)

This invention relates to 1,3-bis(o-ethylphenyl) guanidine believed to be a new chemical compound.

The compound identified as 1,3-bis(o-ethylphenyl) guanidine was prepared by condensing cyanogen chloride and o-ethyl aniline. An aqueous solution of sodium cyanide was neutralized with dilute sulfuric acid at 15–20° C. Chlorine gas was then introduced into the hydrogen cyanide solution so prepared at 0–10° C. The cyanogen chloride was distilled through a water cooled reflux condenser into 125 parts by weight of o-ethyl aniline at a temperature of 150° C. The strongly exothermic reaction raised the temperature to 165° C. The cyanogen chloride addition was continued until the required quantity had been absorbed and the reaction mixture allowed to stand at room temperature over night, then diluted with 160 parts by weight of benzene and the mixture heated to boiling for 30 minutes and allowed to cool. This solution was extracted three times with 500 parts by weight of water and the extracts boiled 30 minutes with charcoal, filtered, cooled, and the free guanidine precipitated with sodium hydroxide. The precipitate was washed with water and dried at 75–80° C. The melting point of the reaction product was 158–159.5° C. After one recrystallization from 50% alcohol white needles melting at 161.5–162° C. were obtained. Analysis for nitrogen gave 15.8% as compared to the calculated value of 15.7%.

1,3 - bis(o - ethylphenyl) guanidine has been found to possess accelerating properties for the vulcanization of rubber and to be especially effective in combination with a thiazole accelerator. It is a stronger accelerator and accelerator activator than diphenyl guanidine without any more tendency to prevulcanize. The position of the ethyl group is important for it has been found that introducing the ethyl group into the para position of the phenyl radical increases the tendency to prevulcanize.

As exemplary of the accelerating properties of the new compound for activating the cure of a thiazole accelerator, rubber stocks were compounded comprising

|  | A | B | C | D |
|---|---|---|---|---|
| Smoked sheets rubber parts by weight | 100 | 100 | 100 | 100 |
| Carbon black do | 50 | 50 | 50 | 50 |
| Zinc oxide do | 5 | 5 | 5 | 5 |
| Stearic acid do | 3 | 3 | 3 | 3 |
| Pine tar do | 2 | 2 | 2 | 2 |
| Sulfur do | 3 | 3 | 3 | 3 |
| Reaction product of p-amino diphenyl and acetone do | 1 | 1 | 1 | 1 |
| 2,2'-Dithio bis benzothiazole do | 1 | 0.7 | 0.7 | 0.7 |
| Diphenyl guanidine do |  | 0.3 |  |  |
| 1,3-Bis(p-ethylphenyl) guanidine parts by weight |  |  | 0.3 |  |
| 1,3-Bis(o-ethylphenyl) guanidine parts by weight |  |  |  | 0.3 |

The stocks so compounded were cured in the usual manner by heating in a press for different periods of time at 135° C. The physical properties of the cured products are set forth below:

Table I

| Stock | Cure Time in Mins. | Modulus of Elasticity in lbs./in.$^2$ at Elongation of 500% | Tensile at Break in lbs./in.$^2$ | Ult. Elong., percent |
|---|---|---|---|---|
| A | 15 | 1,173 | 2,086 | 683 |
| B | 15 | 2,425 | 3,915 | 670 |
| C | 15 | 2,555 | 4,210 | 685 |
| D | 15 | 2,573 | 4,110 | 686 |
| A | 45 | 3,290 | 4,585 | 635 |
| B | 45 | 3,900 | 4,610 | 575 |
| C | 45 | 3,880 | 4,615 | 600 |
| D | 45 | 4,016 | 4,530 | 570 |
| A | 90 | 3,986 | 4,556 | 563 |
| B | 90 | 4,025 | 4,465 | 585 |
| C | 90 | 4,025 | 4,365 | 560 |
| D | 90 | 4,303 | 4,450 | 540 |

It will be noted that the o-ethyl substituted guanidine shows marked activation and is a more powerful activator than either the p-ethyl substituted compound or the unsubstituted diphenyl guanidine.

The tendency of the activated stocks to prevulcanize was determined by measuring the plasticity in a Mooney plastometer at 121° C., the end point being taken as the time when the plasticity begins to rise sharply. The data are set forth below:

Table II

| Stock | Scorch Time, Mins. |
|---|---|
| B | 13 |
| C | 9 |
| D | 13 |

Similar properties were exhibited when the compound was employed as the sole accelerator although as has been stated it is more advantageously used as a secondary accelerator. For example rubber stocks were compounded comprising

|  | E | F | G |
|---|---|---|---|
| Smoked sheets rubber parts by weight | 100 | 100 | 100 |
| Zinc oxide do | 5 | 5 | 5 |
| Stearic acid do | 1 | 1 | 1 |
| Sulfur do | 3 | 3 | 3 |
| Reaction product p-amino biphenyl and acetone parts by weight | 1 | 1 | 1 |
| Diphenyl guanidine do | 1 |  |  |
| 1,3-Bis(p-ethylphenyl)guanidine do |  | 1 |  |
| 1,3-Bis(o-ethylphenyl)guanidine do |  |  | 1 |

These stocks were cured by heating in a press at

135° C. The physical properties of the cured rubber products are set forth below:

*Table III*

| Stock | Cure Time in Mins. | Modulus of Elasticity in lbs./in.² at Elongation of 700% | Tensile at Break in lbs./in.² | Ult. Elong., percent |
|---|---|---|---|---|
| E | 15 | 1,045 | 2,555 | 900 |
| F | 15 | 1,025 | 2,445 | 875 |
| G | 15 | 1,245 | 2,430 | 850 |
| E | 45 | 2,285 | 3,170 | 780 |
| F | 45 | 2,335 | 3,530 | 785 |
| G | 45 | 2,985 | 3,580 | 760 |
| E | 60 | 2,820 | 3,685 | 765 |
| F | 60 | 3,310 | 3,785 | 750 |
| G | 60 | 3,500 | 3,620 | 725 |

The tendency of these stocks to prevulcanize was measured by means of a Mooney plastometer in the manner described.

*Table IV*

| Stock | Scorch Time, Mins. |
|---|---|
| E | 6 |
| F | 4 |
| G | 6 |

It will be noted that the presence of an ethyl group in the para position increases the tendency to prevulcanize.

What is claimed is:

1,3-bis(o-ethylphenyl)guanidine.

DAVID J. BEAVER.

REFERENCES CITED

The following references are of record in the file of this patent:

UNITED STATES PATENTS

| Number | Name | Date |
|---|---|---|
| 1,705,948 | Weiss | Mar. 19, 1929 |

OTHER REFERENCES

Berger: "Ber. deut. Chem.," vol. 12 (1879), page 1855.

Paucksch: "Ber. deut Chem., vol. 17 (1884), pp. 768, 2800, 2802 and 2804.